(12) United States Patent
Munakata et al.

(10) Patent No.: US 12,504,833 B2
(45) Date of Patent: *Dec. 23, 2025

(54) POSITION INDICATING DEVICE AND INFORMATION PROCESSING DEVICE

(71) Applicant: Wacom Co., Ltd., Saitama (JP)

(72) Inventors: Hiroshi Munakata, Saitama (JP); Yoshihisa Sugiyama, Saitama (JP); Yuanhao Chen, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/977,449

(22) Filed: Dec. 11, 2024

(65) Prior Publication Data

US 2025/0110581 A1    Apr. 3, 2025

Related U.S. Application Data

(63) Continuation of application No. 17/084,444, filed on Oct. 29, 2020, now Pat. No. 12,197,653, which is a
(Continued)

(30) Foreign Application Priority Data

May 18, 2018   (JP) ................. 2018-096313

(51) Int. Cl.
*G06F 3/03*      (2006.01)
*G06F 3/01*      (2006.01)
(Continued)

(52) U.S. Cl.
CPC ............ *G06F 3/0317* (2013.01); *G06F 3/011* (2013.01); *G06F 3/03546* (2013.01);
(Continued)

(58) Field of Classification Search
CPC ............... G06F 3/0317; G06F 3/04162; G06F 3/04146; G06F 3/011; G06F 3/03546;
(Continued)

(56) References Cited

U.S. PATENT DOCUMENTS

2006/0170652 A1   8/2006  Bannai et al.
2007/0285405 A1  12/2007  Rehm
(Continued)

FOREIGN PATENT DOCUMENTS

CN     105551339 A     5/2016
JP     H086710 A       1/1996
(Continued)

OTHER PUBLICATIONS

Communication pursuant to Article 94(3), dated Mar. 23, 2022, for European Application No. 19 804 098.2-1216. (6 pages).
(Continued)

*Primary Examiner* — Jonathan A Boyd
(74) *Attorney, Agent, or Firm* — Seed Intellectual Property Law Group LLP

(57) ABSTRACT

A position indicating device includes a housing, a position indicator which, in operation, indicates a position, a first pressure sensor which, in operation, detects a pressure applied to the position indicator, a second sensor which, in operation, detects a second pressure applied to the housing, a first communication circuit which, in operation, transmits the pen pressure detected by the pen pressure sensor, and a second communication circuit which, in operation, transmits the gripping force detected by the gripping force sensor. The position indicating device enables control of a line width and transparency in a preferable manner even when there is no actual touch surface.

20 Claims, 14 Drawing Sheets

Related U.S. Application Data continuation of application No. PCT/JP2019/015042, filed on Apr. 4, 2019.

(51) Int. Cl.
   *G06F 3/0354* (2013.01)
   *G06F 3/041* (2006.01)
   *G06F 3/04815* (2022.01)
   *G06F 3/04883* (2022.01)

(52) U.S. Cl.
   CPC ...... *G06F 3/04146* (2019.05); *G06F 3/04162* (2019.05); *G06F 3/04815* (2013.01); *G06F 3/04883* (2013.01); *G06F 2203/04105* (2013.01)

(58) Field of Classification Search
   CPC ............. G06F 3/04815; G06F 3/04883; G06F 2203/04105; G06F 3/04845; G06F 3/0304; G06F 3/03545; G06F 3/0346; G06F 3/041
   See application file for complete search history.

(56) References Cited

U.S. PATENT DOCUMENTS

| | | |
|---|---|---|
| 2009/0267896 A1 | 10/2009 | Hiramatsu |
| 2012/0206330 A1 | 8/2012 | Cao et al. |
| 2016/0252965 A1 | 9/2016 | Mandella et al. |
| 2016/0306444 A1 | 10/2016 | Fleck |
| 2017/0017310 A1 | 1/2017 | Weddle et al. |
| 2017/0371432 A1 | 12/2017 | Gavriliuc et al. |
| 2018/0129305 A1 | 5/2018 | Fleck |
| 2019/0094996 A1 | 3/2019 | Kim |

FOREIGN PATENT DOCUMENTS

| | | |
|---|---|---|
| JP | H10333815 A | 12/1998 |
| JP | 2006293605 A | 10/2006 |
| JP | 2009266097 A | 11/2009 |
| JP | 2013084096 A | 5/2013 |
| JP | 2013242819 A | 12/2013 |
| JP | 2014062962 A | 4/2014 |
| JP | 2014186589 A | 10/2014 |
| JP | 2018001721 A | 1/2018 |
| KR | 101360980 B1 | 2/2014 |

OTHER PUBLICATIONS

Extended European Search Report, dated Jun. 10, 2021, for European Application No. 19804098.2-1216. (9 pages).
International Search Report, dated May 14, 2019, for International Application No. PCT/JP2019/015042. (2 pages).
Japanese Office Action, dated Mar. 30, 2021, for Japanese Application No. 2020-519507. (8 pages) (with English Translation).
Office Action, dated Sep. 29, 2021, for Chinese Application No. 201980029211.9. (8 pages).

FIG. 7
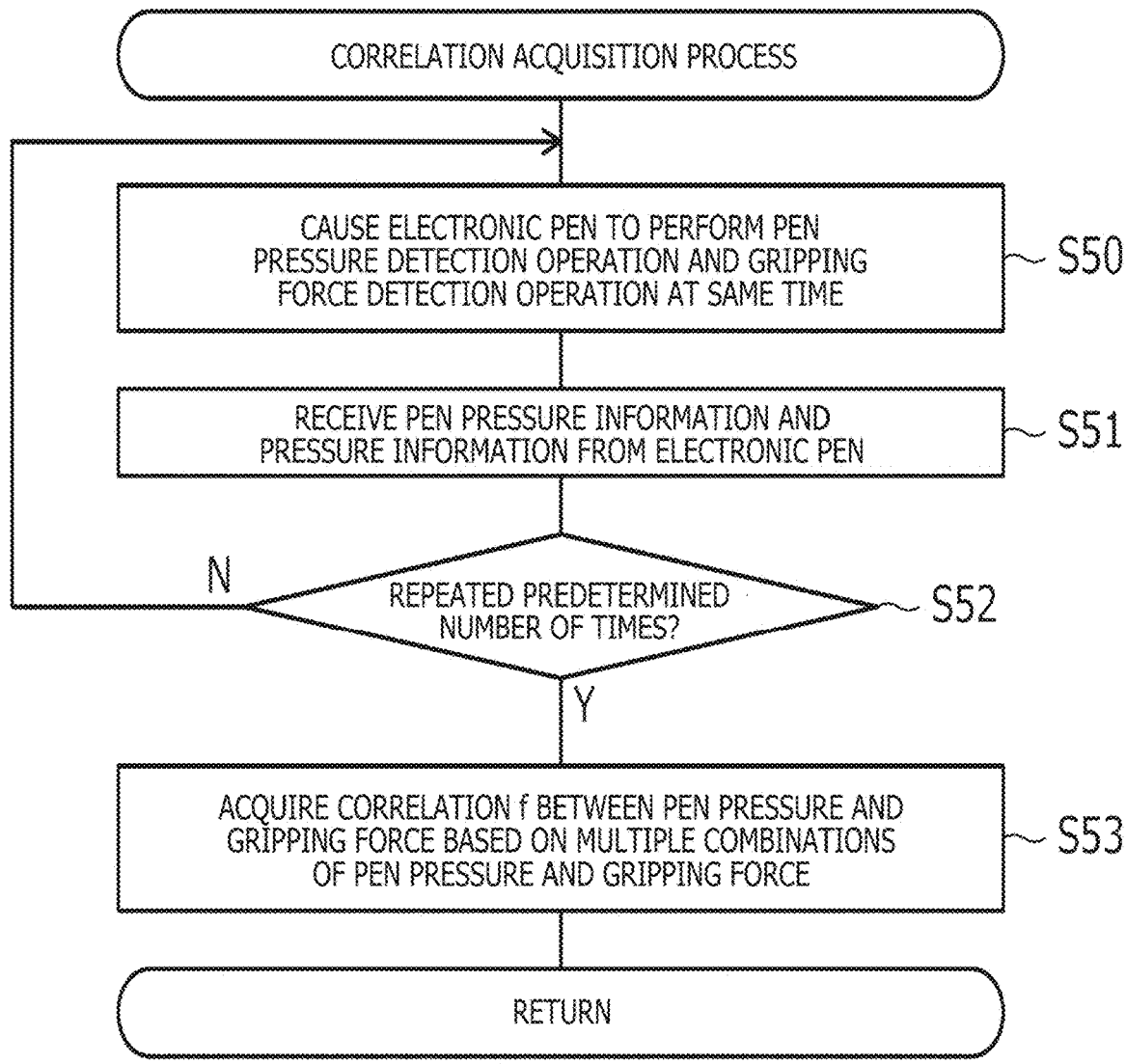
FIG. 8A         FIG. 8B
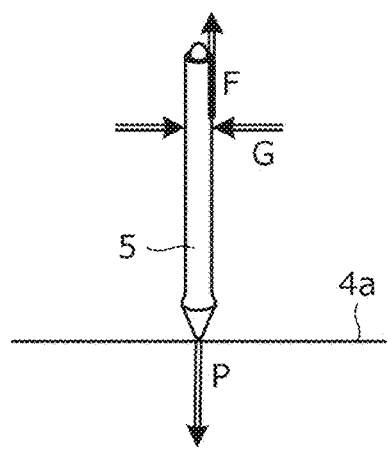 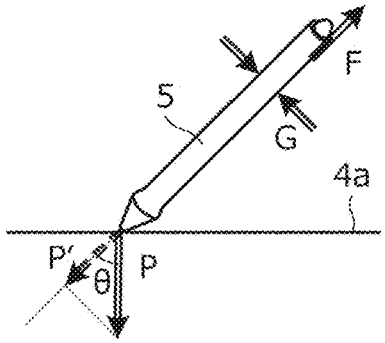

POSITION INDICATING DEVICE AND INFORMATION PROCESSING DEVICE

BACKGROUND

Technical Field

The present disclosure relates to a position indicating device and an information processing device, and particularly, to a pen-type position indicating device in use for indicating both a position in a touch surface and a position in a space, and an information processing device that is connected to such a position indicating device.

Background Art

In recent years, a pen-type position indicating device (hereinafter referred to as an "electronic pen") that is used in combination with a tablet-type computer has attracted attention. This type of electronic pen is usually provided with a pen pressure sensor that detects a pressure (pen pressure) applied to a pen tip. When the computer detects the position of the electronic pen in a touch surface, the computer receives a pen pressure value from the electronic pen. Then, when the computer draws a line image according to the detected position, the computer controls a line width and transparency of the line image according to the received pen pressure value. This configuration can produce the feel of writing similar to that of an existing pen that ejects ink, for example, draw a thicker line as the force with which the pen tip is pressed against the touch surface is greater.

Further, Patent Document 1 discloses a pen-type input device that does not require a touch surface. This pen-type input device includes a pressure sensor on its side surface and is capable of detecting a gripping force of the user. According to the view of Patent Document 1, when the user draws a character or a figure by holding a pen, a characteristic corresponding to the character or the figure to be drawn appears in a change in the gripping force. The technique of Patent Document 1 recognizes this characteristic as the character or the figure, thereby enabling an input of the character or the figure without detecting the position of a pen tip in the touch surface.

PRIOR ART DOCUMENT

Patent Document

Patent Document 1: Japanese Patent Laid-Open No. Hei 8-6710

BRIEF SUMMARY

Technical Problems

Incidentally, the inventors of the present application consider how to make it possible to write a character and draw a picture on a virtual plane in a virtual reality (including VR: Virtual Reality, AR: Augmented Reality, and MR: Mixed Reality) space using the electronic pen described above. In this case, since there is no actual touch surface, the pen pressure value cannot be detected by the above-described pen pressure sensor. Without the pen pressure value, it is not possible to control the line width and the transparency according to the pen pressure value, and therefore, it is not possible to produce the feel of writing similar to that of an existing pen. Accordingly, there has been a need for another method that can control the line width and the transparency in a preferable manner.

Therefore, one of objects of the present disclosure is to provide a position indicating device and an information processing device capable of controlling the line width and the transparency in a preferable manner even when there is no actual touch surface.

Technical Solution

A position indicating device according to the present disclosure includes a housing, a position indicator which, in operation, indicates a position, a first sensor which, in operation, detects a first pressure applied to the position indicator, a second sensor which, in operation, detects a second pressure applied to the housing, a first communication circuit which, in operation, transmits the first pressure detected by the first sensor, and a second communication circuit which, in operation, transmits the second pressure detected by the second sensor.

It is noted that the position indicating device according to the present disclosure may be a position indicating device including a cylindrical external housing accommodating a position indicator for indicating a position in an input surface of a plane position sensor, a spatial position detection circuit which, in operation, detects spatial position information for indicating a position of the position indicating device in a space through interaction with an external device, a pressure sensor which, in operation, detects a force on the external housing, and a control circuit which, in operation, outputs the spatial position information detected by the spatial position detection circuit, plane position information for indicating the position of the position indicator in the input surface, and pressure information regarding the force detected by the pressure sensor.

An information processing device according to the present disclosure is capable of communicating with a position indicating device including a housing, a position indicator which, in operation, indicates a position, and a pressure sensor which, in operation, detects a force applied to the housing. The information processing device includes a communication circuit which, in operation, receives a pressure detected by the pressure sensor, and a controller which, in operation, controls generation of a 3D (Three-Dimensional) object in a virtual reality space based on a position of the position indicating device in a space and the pressure received by the communication circuit.

It is noted that the information processing device according to the present disclosure may be a computer that is configured to be connected to a position indicating device including a cylindrical external housing accommodating a position indicator which, in operation, indicates a position in an input surface of a plane position sensor, and a pressure sensor which, in operation, detects a force applied to a surface of the external housing, and that includes a communication circuit which, in operation, receives, from the position indicating device, spatial position information for indicating a position of the position indicating device in a space, plane position information for indicating the position of the position indicator in the input surface, and pressure information regarding the force detected by the pressure sensor, that includes a controller which, in operation, when the spatial position information and the pressure information have been received, detects a spatial position indicating the position of the position indicating device in the space based on the received spatial position information and perform 3D drawing based on the detected spatial position and the received pressure information, and that, when the plane position information and the pressure information have been received, detects a plane position indicating the position of the position indicator in the touch surface based on the received plane position information and perform 2D (Two-Dimensional) drawing based on the detected plane position and the received pressure information.

Advantageous Effects

When the user writes a character or draws a picture on a virtual plane, a force (=gripping force) detected by a pressure sensor has a certain correlation relation with a pen pressure detected when the user writes a character or draws a picture on an actual touch surface. Therefore, the position indicating device according to the present disclosure is capable of transmitting a pressure detected by a pressure sensor and the information processing device according to the present disclosure is capable of performing 3D drawing based on the pressure detected by the pressure sensor can control the line width and the transparency in a preferable manner even when there is no actual touch surface.

BRIEF DESCRIPTION OF THE DRAWINGS

FIG. 2A is a perspective view of an external appearance of an electronic pen 5, while

FIG. 7 is a processing flow diagram illustrating details of a correlation acquisition process (S30) illustrated in FIG. 6.

FIGS. 8A and 8B depict diagrams for describing a cor-relation f between a pen pressure and a gripping force.

MODES FOR CARRYING OUT THE DISCLOSURE

Hereinafter, embodiments of the present disclosure will be described in detail with reference to the accompanying drawings.

Figure 1:
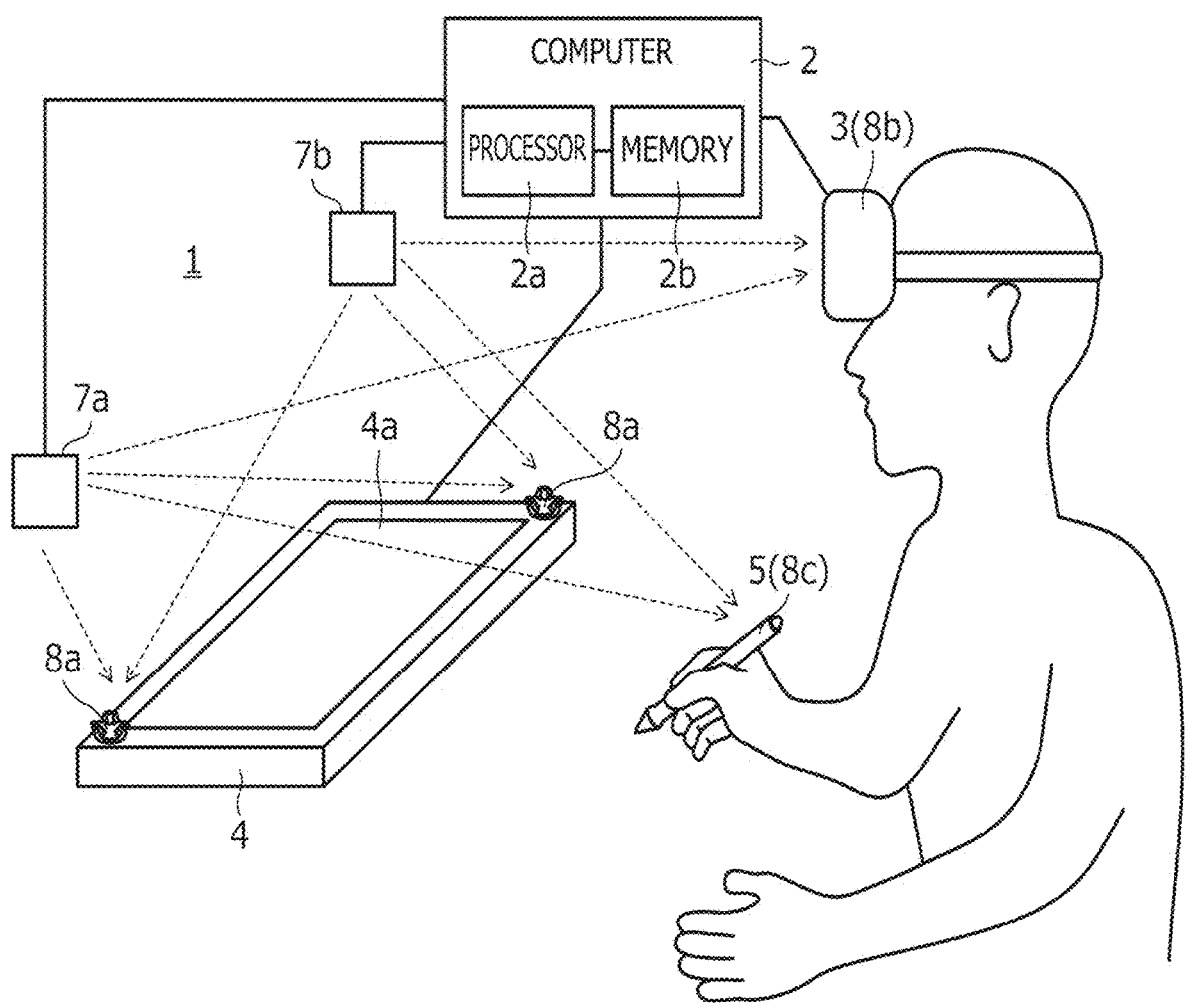
FIG. 1 is a diagram illustrating a configuration of a spatial position indicating system 1 according to a first embodiment of the present disclosure.

FIG. 1 is a diagram illustrating a configuration of a spatial position indicating system 1 according to an embodiment of the present disclosure. As illustrated in the figure, the spatial position indicating system 1 according to the present embodiment includes a computer 2, a virtual reality display 3, a plane position sensor 4, an electronic pen 5, position detection devices 7a and 7b, and spatial position sensors 8a to 8c. The spatial position sensors 8a to 8c are provided in the plane position sensor 4, the virtual reality display 3, and the electronic pen 5, respectively.

In principle, each device illustrated in FIG. 1 is provided in a room. In the spatial position indicating system 1, almost the entire room can be used as a virtual reality space.

The computer 2 includes a processor 2a and a memory 2b. Each processing operation performed by the computer 2 described below is performed by the processor 2a reading and executing a program stored in the memory 2b.

The computer 2 is connected to each of the virtual reality display 3, the position detection devices 7a and 7b, and the plane position sensor 4 by wire or wirelessly. In the case of wired communication, it is preferable to use a USB (Universal Serial Bus), for example. In the case of wireless communication, it is preferable to use a wireless LAN (Local Area Network) such as Wi-Fi (Wireless Fidelity) (registered trademark) or near-field communication such as Bluetooth (registered trademark), for example. It is noted that when the plane position sensor 4 and the virtual reality display 3 have a function as a computer, this computer may constitute a part of or the entire computer 2.

The computer 2 has a function of displaying a virtual reality space on the virtual reality display 3. This virtual reality space may be a VR (Virtual Reality) space, an AR (Augmented Reality) space, or an MR (Mixed Reality) space. When the VR space is displayed, the user wearing the virtual reality display 3 recognizes a virtual reality and is disconnected from the real world. By contrast, when the AR space or the MR space is displayed, the user wearing the virtual reality display 3 recognizes a space in which the virtual reality and the real world are mixed.

The computer 2 functions as a rendering device that renders various 3D objects in the virtual reality space set with the positions of the position detection devices 7a and 7b as a reference. The computer 2 also updates the display of the virtual reality display 3 according to the result of the rendering. Accordingly, various 3D objects appear in the virtual reality space displayed on the virtual reality display 3. The computer 2 performs rendering based on 3D object information stored in the memory 2b. The 3D object information indicates the shape, position, and orientation of the corresponding 3D object in the virtual reality space indicating the virtual reality space set by the computer 2 and is stored in the memory 2b for each 3D object to be rendered.

The 3D objects rendered by the computer 2 include 3D objects such as the plane position sensor 4 and the electronic pen 5 illustrated in FIG. 1 that also exist in reality (hereinafter referred to as "first 3D objects") and 3D objects such as a virtual tablet (not illustrated) that do not exist in reality (hereinafter referred to as "second 3D objects"). When rendering these 3D objects, the computer 2 first detects the position and orientation of the spatial position sensor 8b in the real space and acquires viewpoint information indicating the viewpoint of the user based on the result of the detection.

When rendering first 3D objects, the computer 2 further detects the positions and orientations of the spatial position sensors (e.g., the spatial position sensors 8a and 8c) in the real space, which are mounted in the respective objects, and stores the result of the detection in the memory 2b. Then, the computer 2 renders the first 3D objects in the virtual reality space based on the stored positions and orientations, the above-described viewpoint information, and the shapes stored for the first 3D objects. In addition, for the electronic pen 5 in particular, the computer 2 performs processes of detecting the position of the spatial position sensor 8c to detect an operation performed by the user in the virtual reality space, and based on the result, newly creating a second 3D object (that is, newly storing 3D object information in the memory 2b) or moving or updating a second 3D object that is already held (that is, updating 3D object information that is already stored in the memory 2b).

By contrast, when rendering a second 3D object, the computer 2 renders the second 3D object in the virtual reality space based on the corresponding 3D object information stored in the memory 2b and the above-described viewpoint information.

The virtual reality display 3 is a VR display (head-mounted display) that is worn on the head of a human when used. While there are various types of commercially available virtual reality displays such as "a transmissive type" or "a non-transmissive type" or "a glasses type" or "a hat type," any of these virtual reality displays can be used as the virtual reality display 3.

The virtual reality display 3 is connected to each of the spatial position sensors 8a and the electronic pen 5 (including the spatial position sensor 8c) by wire or wirelessly. Through this connection, each of the spatial position sensors 8a and 8c notifies the virtual reality display 3 of light reception level information described later. The virtual reality display 3 notifies the computer 2 of the light reception level information notified by each of the spatial position sensors 8a and 8c, together with light reception level information of the spatial position sensor 8b incorporated in the virtual reality display 3. The computer 2 detects the position and orientation of each of the spatial position sensors 8a to 8c in the real space based on the corresponding light reception level information notified in this manner.

The plane position sensor 4 is a device including an input surface 4a and a plurality of electrodes (not illustrated) arranged so as to cover the entire input surface 4a. The input surface 4a is preferably a flat surface and can be made of a material suitable for a pen tip of the electronic pen 5 to slide thereon. The plurality of electrodes plays a role of detecting a pen signal (described later) transmitted by the electronic pen 5. The pen signal detected by each electrode is supplied to the computer 2. Based on the supplied pen signal, the computer 2 acquires the position indicated by the electronic pen 5 in the input surface 4a and various kinds of data transmitted by the electronic pen 5. The plane position sensor 4 may be incorporated in a tablet terminal having a display function and a processor, for example. In this case, the processor of the tablet terminal can constitute a part of or the entire computer 2.

The spatial position sensors 8a are fixedly installed on a surface of the plane position sensor 4. Therefore, the positions and orientations of the spatial position sensors 8a detected by the computer 2 indicate the position and orientation of the input surface 4a in a virtual reality space coordinate system.

The electronic pen 5 is a position indicating device having a pen shape. The electronic pen 5 has a function as an input device for the plane position sensor 4 (hereinafter referred to as a "tablet input function") and a function as an input device for the computer 2 (hereinafter referred to as a "virtual reality space input function"). The tablet input function includes a function of indicating a position in the input surface 4a of the plane position sensor 4. Meanwhile, the virtual reality space input function includes a function of indicating a position in the virtual reality space. Details of each function will be described later.

The position detection devices 7a and 7b are base station devices that are included in a position detection system for detecting the positions of the spatial position sensors 8a to 8c. Each of the position detection devices 7a and 7b is capable of emitting a laser signal while changing its direction under the control of the computer 2. Each of the spatial position sensors 8a to 8c includes a plurality of light receiving sensors. The light receiving sensors receive laser signals emitted by the respective position detection devices 7a and 7b to acquire light reception level information including their respective light reception levels. Each piece of light reception level information acquired in this manner is supplied to the computer 2 via the virtual reality display 3 as described above. It is noted that while, in the present embodiment, the position detection devices 7a and 7b have the configuration in which laser signals can be emitted, the configuration is not limited thereto. Another possible configuration may be, for example, to use other non-visible light sensors, visible light sensors, or a combination thereof.

Figure 2A:
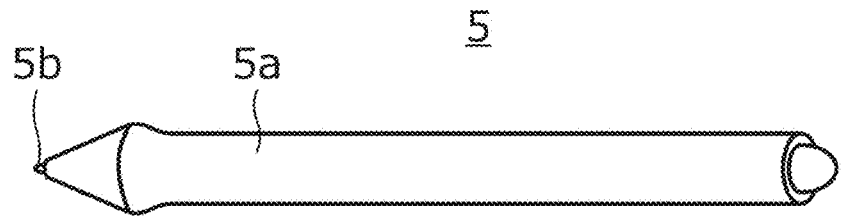

FIG. 2A is a perspective view of the external appearance of the electronic pen 5. As illustrated in the figure, the electronic pen 5 includes a cylindrical external housing 5a. The external housing 5a accommodates a pen tip 5b (position indicator) for indicating a position in the input surface 4a of the plane position sensor 4. It is noted that although a gripping force sensor 55 described later and various members included in various switches are attached to a surface of the actual electronic pen 5, drawing of these members is omitted in FIG. 2A.

When the user performs an input using the tablet input function, the user holds the external housing 5a with one hand and brings the pen tip 5b into contact with the input surface 4a of the plane position sensor 4. Subsequently, the user moves the pen tip 5b on the input surface 4a while maintaining the contact. In this manner, the user performs the input operation with the electronic pen 5. By contrast, when the user performs an input using the virtual reality space input function, the user holds the external housing 5a with one hand and moves the electronic pen 5 in the air. In this manner, the user performs the input operation with the electronic pen 5. The input using the virtual reality space input function includes an input to the virtual tablet described above.

Figure 2B:
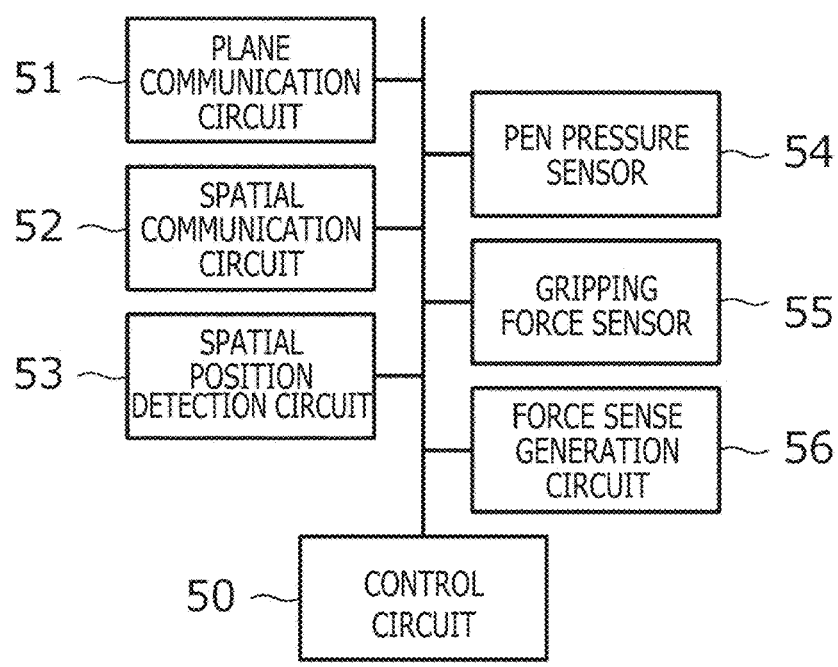
FIG. 2B is a schematic block diagram illustrating functional blocks of the electronic pen 5.

FIG. 2B is a schematic block diagram illustrating functional blocks of the electronic pen 5. As illustrated in the figure, the electronic pen 5 includes a control circuit 50, a plane communication circuit 51, a spatial communication circuit 52, a spatial position detection circuit 53, a pen pressure sensor 54, the gripping force sensor 55 (pressure sensor), and a force sense generation circuit 56. It is noted that the electronic pen 5 may include only one of the pen pressure sensor 54 and the gripping force sensor 55, and the following description also includes such a case.

The control circuit 50 includes a memory and a processor that is connected to each of the other components in the electronic pen 5 and controls these components while performing various processes described later. The processor of the control circuit 50 reads and executes a program stored in the memory to control each of the other components in the electronic pen 5 and perform various processes described later.

The plane communication circuit 51 transmits and receives signals to and from the computer 2 via the plane position sensor 4 under the control of the control circuit 50. In this transmission/reception, the plurality of electrodes arranged in the input surface 4a of the plane position sensor 4 and a pen tip electrode (not illustrated) provided in the vicinity of the pen tip 5b of the electronic pen 5 are used as antennas. Further, this transmission/reception includes a case where signals are unidirectionally transmitted from the electronic pen 5 to the plane position sensor 4 and a case where signals are bidirectionally transmitted and received between the electronic pen 5 and the plane position sensor 4. The following description continues on the assumption of the latter case. A signal transmitted from the plane position sensor 4 to the electronic pen 5 will be referred to as a "beacon signal" while a signal transmitted from the electronic pen 5 to the plane position sensor 4 will be referred to as a "pen signal." For example, an electromagnetic induction method or an active capacitive method can be used as a concrete method of the signal transmission/reception for this case.

The beacon signal is a signal transmitted by the computer 2 at predetermined time intervals, for example, and includes a command for controlling the electronic pen 5 from the computer 2. The pen signal includes a burst signal (plane position information for indicating the position of the pen tip 5b in the input surface 4a) and a data signal. The burst signal is an unmodulated carrier wave. The data signal is obtained by modulating a carrier wave using data requested to be transmitted by the command.

The spatial communication circuit 52 has a function of transmitting and receiving signals to and from the computer 2 via the virtual reality display 3 under the control of the control circuit 50. These signals are transmitted and received by wire or wirelessly as described above. The plane position sensor 4 does not intervene in transmission and reception of the signals between the spatial communication circuit 52 and the computer 2.

The spatial position detection circuit 53 includes the spatial position sensor 8c illustrated in FIG. 1 and plays a role of detecting the above-described light reception level information (spatial position information for indicating the position of the electronic pen 5 in the space) through interaction with external devices (specifically, the position detection devices 7a and 7b). Specifically, the spatial position detection circuit 53 performs processes of periodically or continuously performing an operation of detecting laser signals transmitted by the position detection devices 7a and 7b, generating light reception level information corresponding to the detected laser signals, and supplying the light reception level information to the control circuit 50 each time.

The pen pressure sensor 54 is capable of detecting a force (pen pressure) applied to the pen tip 5b and includes, for example, a capacitance sensor (not illustrated) whose capacitance value changes according to the pen pressure.

The control circuit 50 has functions of acquiring the pen pressure detected by the pen pressure sensor 54 and generating pen pressure information regarding the acquired pen pressure. The pen pressure information is, for example, a digital value obtained by performing analog-digital conversion on the pen pressure that is analog information.

The gripping force sensor 55 is capable of detecting a force (=a gripping force) on the surface of the external housing 5a of the electronic pen 5. A specific configuration of the gripping force sensor 55 will be described later in detail with reference to the drawings. The control circuit 50 has functions of acquiring the gripping force detected by the gripping force sensor 55 and generating pressure information regarding the acquired gripping force. The pressure information is, for example, a digital value obtained by performing analog-digital conversion on the gripping force that is analog information.

The force sense generation circuit 56 has a function of generating a force sense according to a control signal supplied from the computer 2. The force sense here is, for example, the vibration of the external housing 5a. For example, when the pen tip 5b is in contact with a surface of the virtual tablet (more accurately, when the pen tip 5b is present within a predetermined distance from the surface of the virtual tablet), the computer 2 supplies the control signal to the electronic pen 5 via the spatial communication circuit 52. This causes the force sense generation circuit 56 to generate a force sense. Accordingly, the user can gain a feeling that the pen tip 5b collides with the surface of the virtual tablet that does not exist in reality.

When an input is performed using the tablet input function, the control circuit 50 first performs an operation of detecting a beacon signal transmitted from the computer 2 via the plane communication circuit 51. As a result, when the beacon signal has been detected, the control circuit 50 sequentially outputs the above-described burst signal and data signal to the plane communication circuit 51 as a response to the beacon signal. The data signal output in this manner can include the above-described pen pressure information or pressure information. The plane communication circuit 51 transmits the burst signal and the data signal input in this manner to the computer 2 via the plane position sensor 4.

When the computer 2 receives the burst signal via the plane position sensor 4, the computer 2 detects a plane position indicating the position of the pen tip 5b in the input surface 4a based on the reception intensity of the burst signal in each of the plurality of electrodes arranged in the input surface 4a. Further, the computer 2 acquires data transmitted by the electronic pen 5 by receiving the data signal using the electrode closest to the detected plane position among the plurality of electrodes arranged in the input surface 4a. Then, the computer 2 performs 2D drawing based on the detected plane position and the received data. Details of 2D drawing will be described later. The tablet input function is realized in this manner.

By contrast, when an input is performed using the virtual reality space input function, the control circuit 50 sequentially outputs the light reception level information supplied from the spatial position detection circuit 53 to the spatial communication circuit 52. Further, the control circuit 50 also outputs the pen pressure information or the pressure information generated as described above to the spatial communication circuit 52, together with the light reception level information. The spatial communication circuit 52 transmits each information input in this manner to the computer 2.

When the computer 2 receives each information described above from the spatial communication circuit 52, the computer 2 detects a spatial position indicating the position of the electronic pen 5 in the space based on the received light reception level information. In this case, information indicating the shape of the electronic pen 5 and a relative positional relation between the spatial position detection circuit 53 and the pen tip 5*b* may be stored in the computer 2 in advance, and the computer 2 may convert the position obtained directly from the light reception level information into the position of the pen tip 5*b* based on this information and detect the position obtained by the conversion as a spatial position. The computer 2 performs 3D drawing based on the detected spatial position and the received pen pressure information or pressure information. Details of 3D drawing will also be described later. The virtual reality space input function is realized in this manner.

Figure 3:
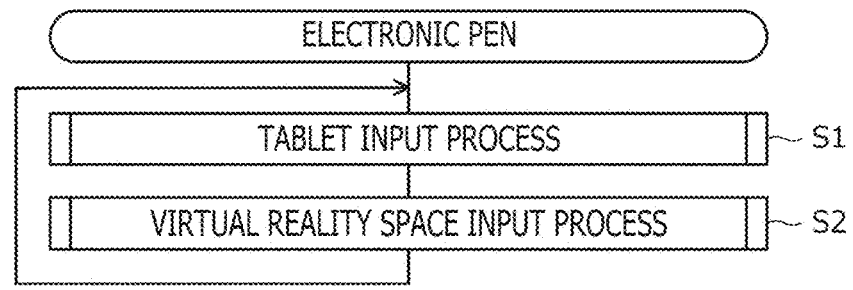
FIG. 3 is a processing flow diagram illustrating processing performed by a control circuit 50 of the electronic pen 5.
Figure 4:
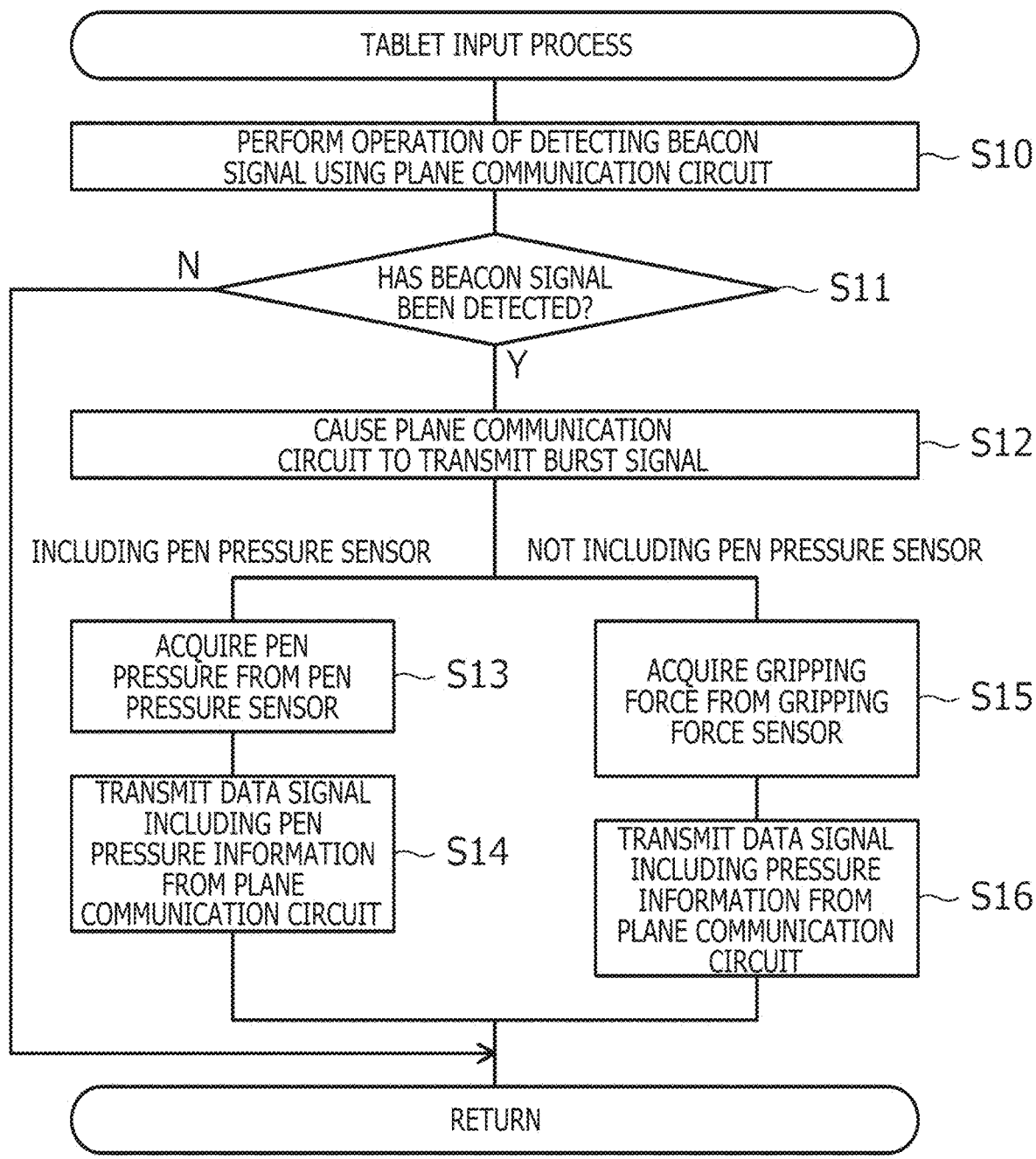
FIG. 4 is a processing flow diagram illustrating details of a tablet input process illustrated in FIG. 3.
Figure 5:
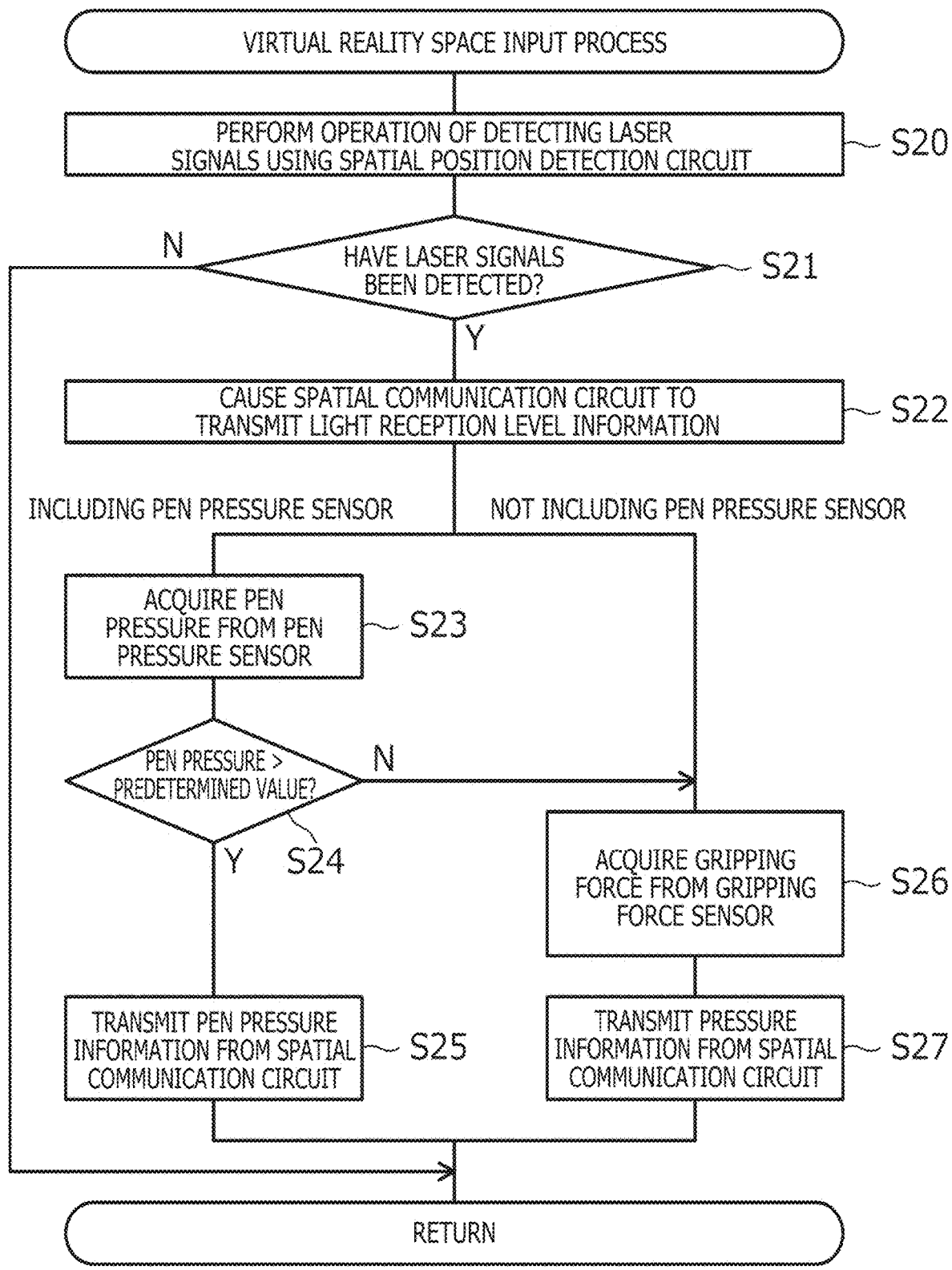
FIG. 5 is a processing flow diagram illustrating details of a virtual reality space input process illustrated in FIG. 3.

FIG. 3 is a processing flow diagram illustrating processing performed by the control circuit 50 of the electronic pen 5. Further, FIG. 4 is a processing flow diagram illustrating details of a tablet input process (S1) illustrated in FIG. 3. FIG. 5 is a processing flow diagram illustrating details of a virtual reality space input process (S2) illustrated in FIG. 3. Hereinafter, the operation of the electronic pen 5 will be described in detail with reference to these FIGS. 3 to 5.

First, as illustrated in FIG. 3, the control circuit 50 performs the tablet input process (S1) and the virtual reality space input process (S2) in a time division manner.

Next, referring to FIG. 4, the control circuit 50, which performs the tablet input process, first performs an operation of detecting a beacon signal using the plane communication circuit 51 (S10 and S11). In this detection operation, the plane communication circuit 51 attempts to detect a beacon signal by demodulating a signal that has reached the pen tip electrode described above. As a result, when the beacon signal has not been detected, the control circuit 50 ends the tablet input process. On the other hand, when the beacon signal has been detected, the control circuit 50 outputs a burst signal to the plane communication circuit 51, causing the plane communication circuit 51 to transmit the burst signal (S12).

The subsequent process differs depending on whether or not the electronic pen 5 includes the pen pressure sensor 54. In the former case, the control circuit 50 acquires a pen pressure from the output of the pen pressure sensor 54 (S13), and transmits, from the plane communication circuit 51, a data signal including pen pressure information regarding the acquired pen pressure (S14). By contrast, in the latter case, the control circuit 50 acquires a gripping force from the output of the gripping force sensor 55 (S15), and transmits, from the plane communication circuit 51, a data signal including pressure information regarding the acquired gripping force (S16). After the transmission at S14 or S16, the control circuit 50 ends the tablet input process and starts the next virtual reality space input process (S2), as can be understood from FIG. 3.

Next, referring to FIG. 5, the control circuit 50, which performs the virtual reality space input process, first performs an operation of detecting laser signals using the spatial position detection circuit 53 (S20 and S21). As a result, when no laser signal has been detected, the control circuit 50 ends the virtual reality space input process. By contrast, when laser signals have been detected, the control circuit 50 acquires light reception level information corresponding to the laser signals from the spatial position detection circuit 53 and causes the spatial communication circuit 52 to transmit the light reception level information (S22).

The subsequent process differs depending on whether or not the electronic pen 5 includes the pen pressure sensor 54. In the latter case, the control circuit 50 acquires a gripping force from the output of the gripping force sensor 55 (S26), and transmits, from the spatial communication circuit 52, pressure information regarding the acquired gripping force (S27). By contrast, in the former case, the control circuit 50 acquires a pen pressure from the output of the pen pressure sensor 54 (S23) and determines whether or not the acquired pen pressure exceeds a predetermined value (S24). This determination is to determine whether or not the pen tip 5*b* is in contact with an actual surface and is performed so as not to use the pen pressure when the pen tip 5*b* is not in contact therewith. It is noted that the actual surface here corresponds to a surface such as a simple plate. Accordingly, for example, arranging the actual plate so as to match the display position of the virtual tablet makes it possible to use the pen pressure sensor 54 for the virtual tablet.

When it is determined at S24 that the pen pressure exceeds the predetermined value, the control circuit 50 transmits, from the spatial communication circuit 52, pen pressure information regarding the acquired pen pressure (S25). On the other hand, when it is determined at S24 that the pen pressure does not exceed the predetermined value, the control circuit 50 advances the process to S26 and transmits the pressure information (S26 and S27). After the transmission at S25 or S27, the control circuit 50 ends the virtual reality space input process and starts the next tablet input process (S1), as can be understood from FIG. 3.

Figure 6:
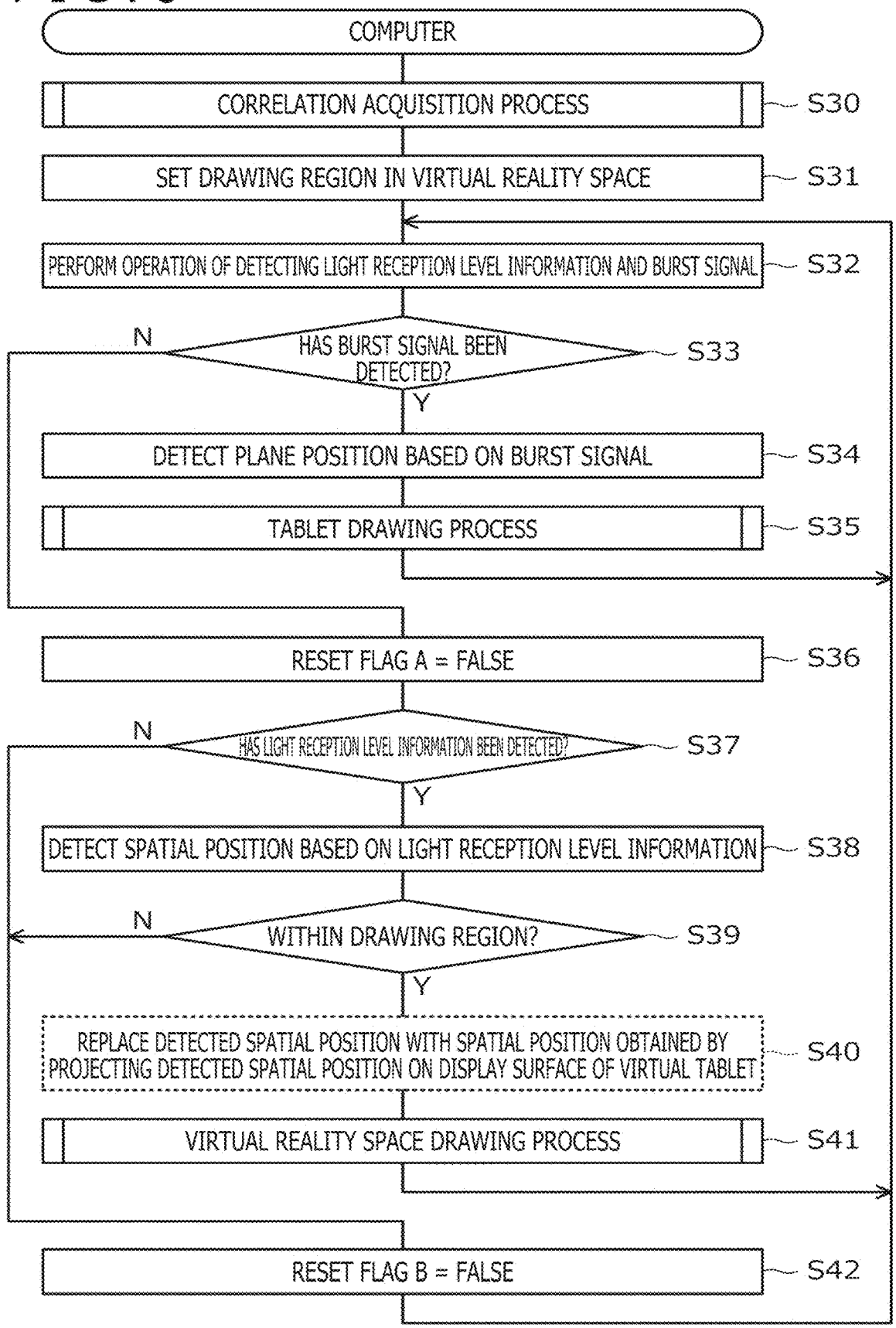
FIG. 6 is a processing flow diagram illustrating processing performed by a processor 2a of a computer 2.
Figure 10:
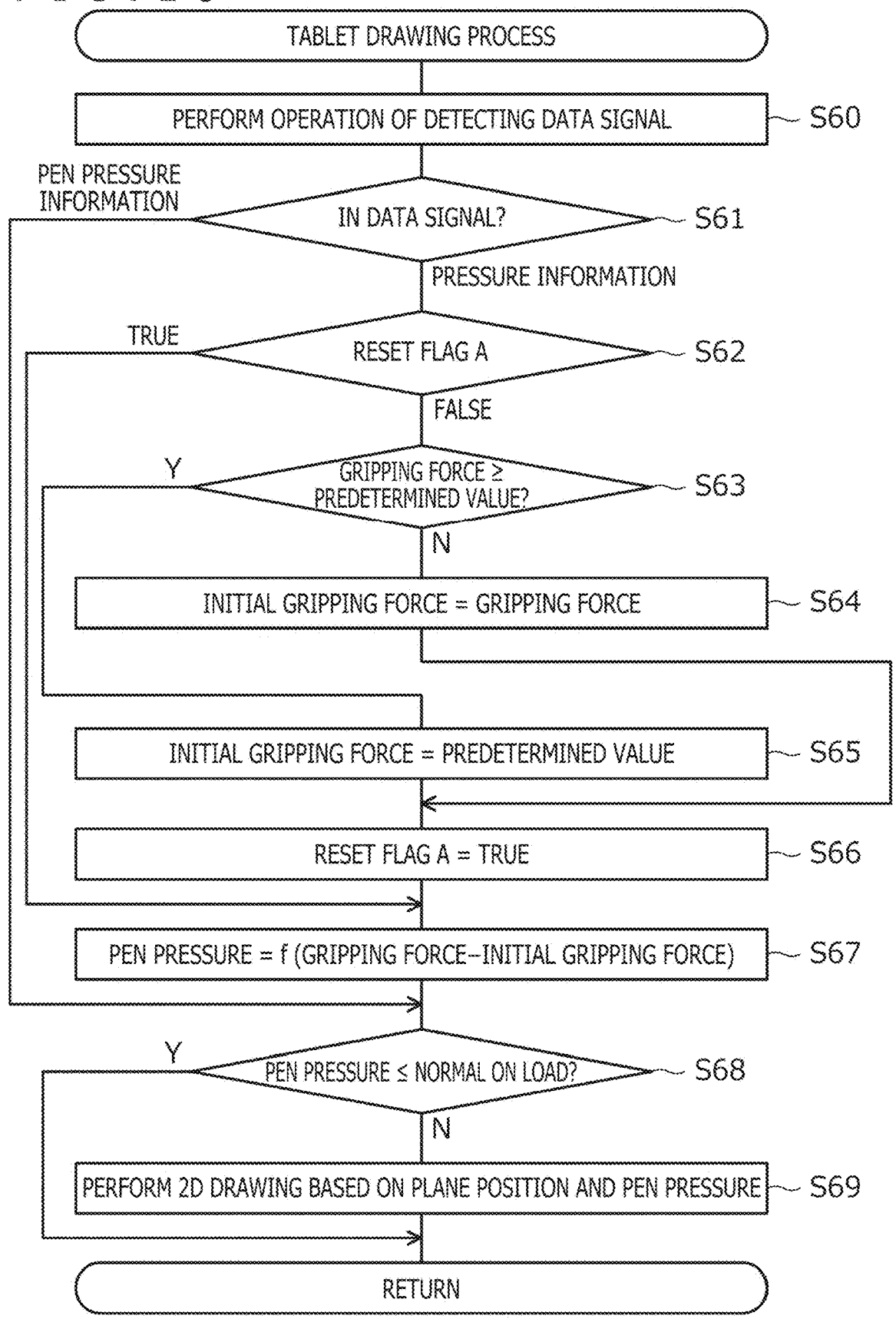
FIG. 10 is a processing flow diagram illustrating details of a tablet drawing process illustrated in FIG. 6.
Figure 11:
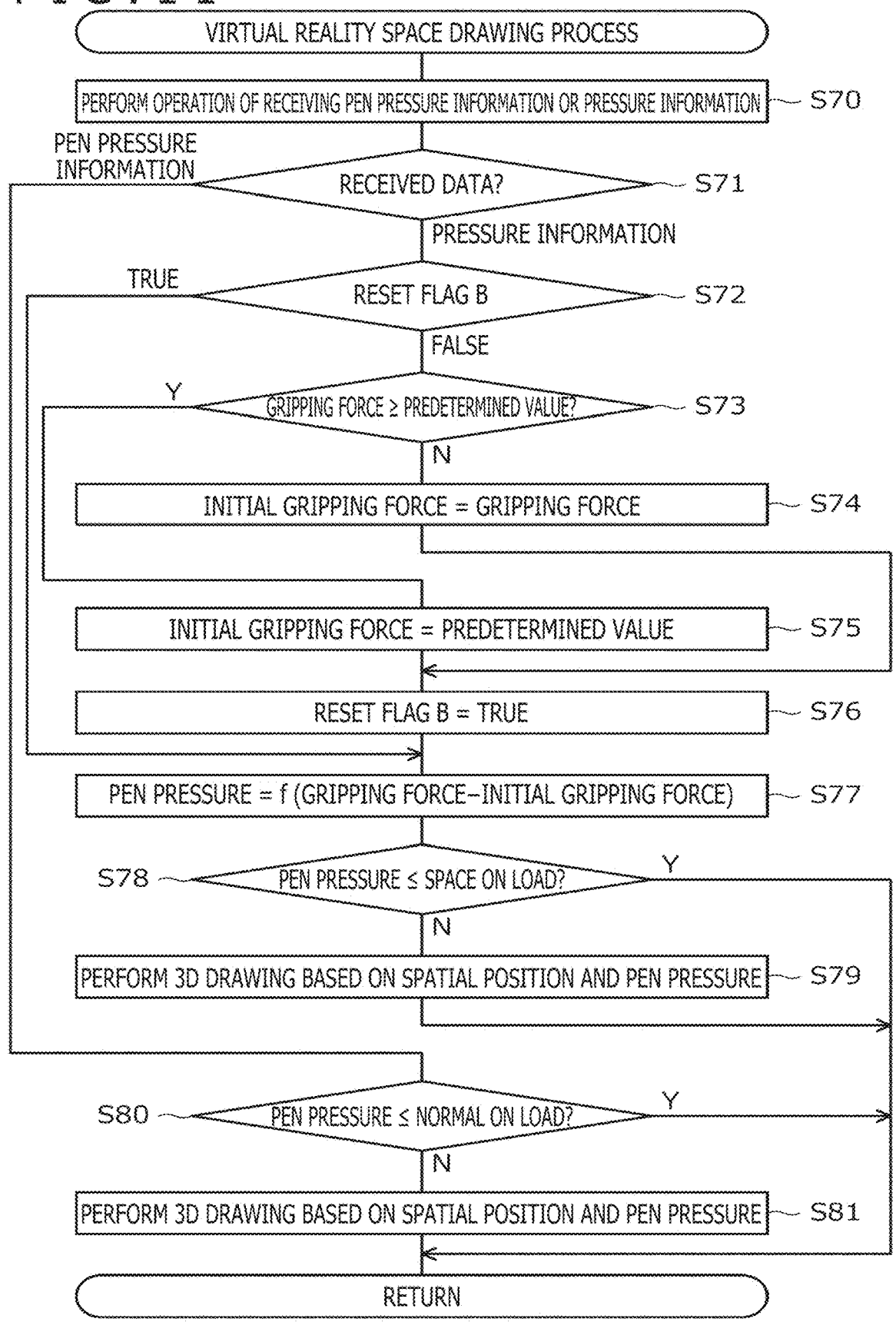
FIG. 11 is a processing flow diagram illustrating details of a virtual reality space drawing process illustrated in FIG. 6.

FIG. 6 is a processing flow diagram illustrating processing performed by the processor 2*a* of the computer 2. Further, FIG. 7 is a processing flow diagram illustrating details of a correlation acquisition process (S30) illustrated in FIG. 6. FIG. 10 is a processing flow diagram illustrating details of a tablet drawing process (S35) illustrated in FIG. 6. FIG. 11 is a processing flow diagram illustrating details of a virtual reality space drawing process (S41) illustrated in FIG. 6. Hereinafter, the operation of the computer 2 will be described in detail with reference to these figures.

As illustrated in FIG. 6, the processor 2*a* first performs the correlation acquisition process (S30).

The correlation acquisition process is a process of acquiring a correlation f between a pen pressure detected by the pen pressure sensor 54 and a gripping force detected by the gripping force sensor 55. In this process, as illustrated in FIG. 7, the processor 2*a* first causes the electronic pen 5 to perform a pen pressure detection operation by the pen pressure sensor 54 and a gripping force detection operation by the gripping force sensor 55 at the same time over a predetermined number of times, and receives pen pressure information and pressure information from the electronic pen 5 each time (S50 to S52).

After repeating the predetermined number of times, the processor 2*a* acquires the correlation f between the pen pressure and the gripping force based on multiple combinations of the pen pressure and the gripping force that have been acquired (S53) and ends the correlation acquisition process. The correlation f acquired in this manner is, for example, a correlation function representing a correlation between the pen pressure and the gripping force. In one example, the correlation f is expressed in the form of a pen pressure=f(gripping force). The following description continues on the assumption that the correlation f is used.

FIGS. 8A and 8B are diagrams for describing the correlation f between a pen pressure and a gripping force. In these figures, P represents a pen pressure, G represents a gripping force, and F represents a frictional force between the user's hand and the surface of the electronic pen 5.

First, referring to FIG. 8A, when the user attempts to draw a line while holding the electronic pen 5 perpendicularly to the input surface 4a, P≈F holds. Further, a relation of F≈μG holds between the gripping force G and the friction force F. It is noted that u is a friction coefficient between the user's hand and the surface of the electronic pen 5. Therefore, P≈μG holds.

Next, referring to FIG. 8B, when the user attempts to draw a line while holding the electronic pen 5 so as to incline the electronic pen 5 by an angle θ relative to a normal direction of the input surface 4a, F≈P'=Pcosθ holds. It is noted that P' is a component of force of the pen pressure P in a pen axis direction. Therefore, in this case, Pcosθ=μG holds from the relation of F≈μG described above.

The relation of Pcosθ=μG also includes the case illustrated in FIG. 8A. Therefore, the correlation f can be universally expressed when f(G)≈μG/cos θ holds. However, since the friction coefficient μ and the angle θ appearing therein are amounts that can vary from user to user, it is necessary to obtain a pen pressure=f(gripping force) for each user after all. Therefore, it is necessary to perform the correlation acquisition process as described with reference to FIG. 7.

Returning to FIG. 6, the processor 2a, which has completed the correlation acquisition process, subsequently sets a drawing region in the virtual reality space (S31). The drawing region is a region in which 3D drawing is performed by the electronic pen 5.

Figure 9A:
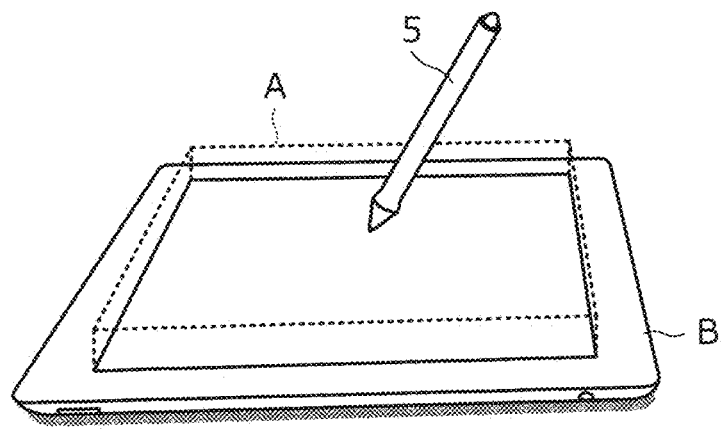
FIGS. 9A and 9B are diagrams each illustrating a specific example of a drawing region.
Figure 9B:
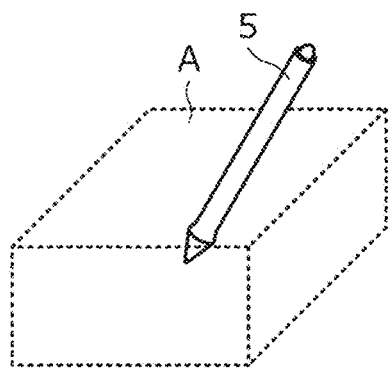

FIGS. 9A and 9B are diagrams each illustrating a specific example of the drawing region. FIG. 9A illustrates an example in which a region within a predetermined distance from a display surface of a virtual tablet B is set as a drawing region A. The drawing region A according to this example is a region in which an input to the virtual tablet B is possible. When a detected spatial position is within this type of drawing region A, the processor 2a performs 3D drawing after replacing the detected spatial position with a spatial position obtained by projecting the detected spatial position on the display surface of the virtual tablet B during the virtual reality space drawing process illustrated at S35 described later. This allows the user to draw a plane figure on the display surface of the virtual tablet B. It is noted that the above-described predetermined distance is preferably set to a value greater than 0. This is because when the user attempts to make an input to the display surface of the virtual tablet B with the electronic pen 5, it is difficult to keep the electronic pen 5 in contact with the display surface that does not physically exist.

FIG. 9B illustrates an example in which any three-dimensional space is set as the drawing region A. When a detected spatial position is within the drawing region A, the processor 2a performs 3D drawing without performing the replacement as in the example of FIG. 9A. This allows the user to draw a three-dimensional figure in the drawing region A.

Returning to FIG. 6, the processor 2a subsequently performs an operation of detecting light reception level information and a burst signal (S32). Specifically, this process includes a process of receiving light reception level information from the electronic pen 5 by wire or wirelessly and a process of receiving a burst signal from the electronic pen 5 via the plane position sensor 4. The processor 2a performs S32, and when, as a result, the burst signal has been detected (determination is positive at S33), the processor 2a advances the process to S34. When the burst signal has not been detected (determination is negative in S33), the processor 2a advances the process to S36.

The processor 2a, which has advanced the process to S34, detects the above-described plane position (the position of the pen tip 5b in the input surface 4a) based on the detected burst signal (S34). After that, for example, the processor 2a performs the tablet drawing process for performing 2D drawing on the display of the tablet terminal including the plane position sensor 4 (S35).

In the tablet drawing process, as illustrated in FIG. 10, the processor 2a first performs an operation of detecting a data signal transmitted by the electronic pen 5 via the plane position sensor 4 (S60). Then, the processor 2a determines which of the pen pressure information and the pressure information is included in the data signal (S61).

When the pen pressure information is determined to be included at S61, the processor 2a further determines whether or not the pen pressure indicated by the pen pressure information is equal to or less than a predetermined normal ON load (e.g., 0) (S68). As a result, when the pen pressure is determined to be equal to or less than the normal ON load, the processor 2a ends the process without performing 2D drawing. This is a process when it is considered that the pen tip 5b of the electronic pen 5 is not in contact with the input surface 4a (what is generally called hover state). On the other hand, when the pen pressure is determined to be greater than the normal ON load at S68, the processor 2a performs 2D drawing on the display of the tablet terminal that is the plane position sensor 4, for example, based on the plane position detected at S34 and the pen pressure indicated by the pen pressure information (S69).

The 2D drawing performed at S69 will be specifically described here. The 2D drawing includes a rendering process and a display process. In the rendering process, the processor 2a arranges a circle having a radius matching the corresponding pen pressure at each of a series of plane positions that are sequentially detected. Then, smoothly connecting the circumferences of the respective circles generates two-dimensional curve data (ink data) having a width corresponding to the pen pressure. The display process is a process of displaying the curve data generated in this manner on the display of the tablet terminal that is the plane position sensor 4, for example.

When the pressure information is determined to be included at S61, the processor 2a performs a process for converting the gripping force indicated by the pressure information into a pen pressure (S62 to S67). Specifically, the processor 2a first determines whether a reset flag A is true or false (S62). The reset flag A is a flag that indicates whether or not the electronic pen 5 has just entered a range in which the burst signal reaches the plane position sensor 4. When the electronic pen 5 has just entered the range, the determination result at S62 is false.

The processor 2a, which has made the false determination at S62, further determines whether or not the gripping force indicated by the pressure information is equal to or greater than a predetermined value (S63). Then, when the gripping force is determined to be less than the predetermined value, the gripping force indicated by the pressure information is set as an initial gripping force (S64). When the gripping force is determined to be equal to or greater than the predetermined value, the predetermined value is set as the initial gripping force (S65). It is noted that the initial gripping force is a variable that is used to treat the gripping force when the electronic pen 5 enters the range in which the burst signal reaches the plane position sensor 4 (at the time of pen down) as 0. Further, S65 defines the upper limit of the initial gripping force and is used, for example, to prevent the gripping force necessary for increasing the line width from becoming too large, preventing the user from being unable to exert a sufficient pen pressure.

Figure 12:
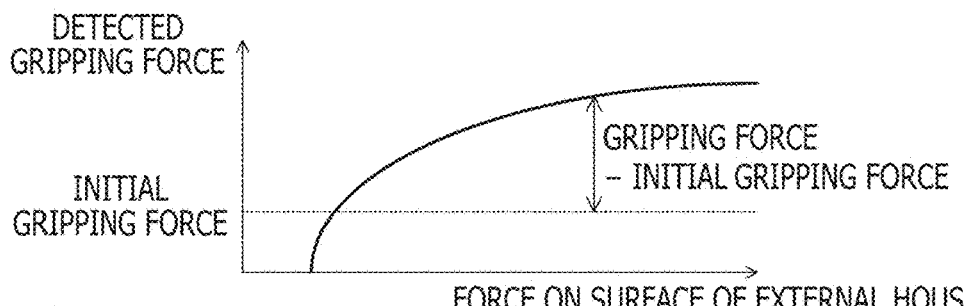
FIG. 12 is a diagram for describing the meaning of an initial gripping force.

FIG. 12 is a diagram for describing the meaning of the initial gripping force. In a graph illustrated in this figure, the horizontal axis represents a force on the surface of the external housing 5a, while the vertical axis represents a gripping force detected by the gripping force sensor 55. As a gripping force, the processor 2a does not use the gripping force itself detected by the gripping force sensor 55 but uses a value obtained by subtracting the initial gripping force from the gripping force. With this configuration, the user can input a pen pressure using the gripping force by increasing or decreasing the gripping force with the gripping force at the time of pen down as a reference.

Returning to FIG. 10, when the processor 2a performs S64 or S65, the processor 2a sets the reset flag A to true (S66). After that, the processor 2a performs the process of converting the gripping force into a pen pressure using the correlation f (S67). The S67 is also performed when true determination is made at S62. At S67, the processor 2a substitutes a value obtained by subtracting the initial gripping force from the gripping force indicated by the pressure information into the correlation f as a gripping force. Accordingly, as described with reference to FIG. 12, the user can input a pen pressure using the gripping force by increasing or decreasing the gripping force with the gripping force at the time of pen down as a reference.

The processor 2a, which has obtained the pen pressure at S67, performs S68 and S69 using this pen pressure. These realize 2D drawing similar to the case where the pen pressure information is included in the data signal.

The processor 2a, which has performed S69, ends the tablet drawing process. Then, the processor 2a returns to S32 of FIG. 6 to perform the operation of detecting the next light reception level information and burst signal.

The processor 2a, which has advanced the process to S36 of FIG. 6, first sets the reset flag A to false (S36). This makes it possible to return the reset flag A to false when the electronic pen 5 is moved out of the range in which the burst signal reaches the plane position sensor 4.

Subsequently, the processor 2a determines whether or not light reception level information has been detected by the detection operation at S32 (S37). Then, when the light reception level information is determined to have been detected, the processor 2a detects the above-described spatial position (the position of the electronic pen 5 (or its pen tip 5b) in the space) based on the detected light reception level information (S38). Subsequently, the processor 2a determines whether or not the detected spatial position is the position within the drawing region set at S31 (S39).

The processor 2a, which has determined at S39 that the detected spatial position is the position within the drawing region, performs the virtual reality space drawing process for performing 3D drawing in the virtual reality space (S41). Here, as indicated by a broken line in FIG. 6, the process of replacing the detected spatial position with a spatial position obtained by projecting the detected spatial position on the display surface of the virtual tablet may be inserted between S39 and S41 (S40). At S40 is a process that can be performed only when the drawing region including the detected spatial position is a region set on the display surface of the virtual tablet B as illustrated in FIG. 9A. This allows the user to draw a plane figure on the display surface of the virtual tablet, as described above.

In the virtual reality space drawing process, as illustrated in FIG. 11, the processor 2a first performs an operation of receiving pen pressure information or pressure information (S70). Then, the processor 2a determines which of the pen pressure information and the pressure information has been received (S71).

When the pen pressure information is determined to have been received at S71, the processor 2a further determines whether or not the pen pressure indicated by the pen pressure information is equal to or less than the predetermined normal ON load (e.g., 0) (S80). As a result, when the pen pressure is determined to be equal to or less than the normal ON load, the processor 2a ends the process without performing 3D drawing. This is a process when it is considered that the pen tip 5b of the electronic pen 5 is not in contact with the above-described actual plate (for example, the one that is arranged so as to match the display position of the virtual tablet). On the other hand, when the pen pressure is determined to be greater than the normal ON load at S80, the processor 2a performs 3D drawing in the virtual reality space based on the spatial position detected at S38 (or the spatial position acquired at S40) and the pen pressure indicated by the pen pressure information (S81).

As in the case of 2D drawing, the 3D drawing performed at S79 also includes a rendering process and a display process. In the rendering process, the processor 2a arranges a sphere having a radius matching the corresponding pen pressure at each of a series of spatial positions that are sequentially detected. Then, smoothly connecting the surfaces of the respective spheres generates three-dimensional curve data having a cross-sectional diameter corresponding to the pen pressure. The display process is a process of displaying the curve data generated in this manner in the virtual reality space. It is noted that when the processor 2a fixes the spatial position to a position in the display surface of the virtual tablet by performing S40, the processor 2a may perform 2D drawing in the display surface, instead of 3D drawing.

When the pressure information is determined to have been received at S71, the processor 2a performs a process for converting the gripping force indicated by the pressure information into a pen pressure (S72 to S77). The details of this process are similar to the processes at S62 to S67 illustrated in FIG. 10. In S77, the pen pressure as the result of the conversion is acquired. It is noted that, in S72 to S77, a reset flag B is used instead of the reset flag A. The reset flag B is a flag that indicates whether or not the electronic pen 5 has just entered the drawing region. When the electronic pen 5 has just entered the drawing region, the determination result at S72 is false.

The processor 2a, which has obtained the pen pressure at S77, performs S78 and S79 using this pen pressure. These processes at S78 and S79 are processes similar to those at S80 and S81, except that instead of the normal ON load, the processor 2a uses a value different from the normal ON load, preferably a space ON load that is set to a value greater than the normal ON load (that is, the processor 2a determines at S78 whether or not the pen pressure indicated by the pressure information is equal to or less than the predetermined space ON load (>normal ON load)). These processes realize 3D drawing similar to the case where the pen pressure information is received.

Compared to the case where the electronic pen 5 is operated while in contact with a fixed surface such as the input surface 4a, a gripping force increases as much as necessary to support the weight of the electronic pen 5 when the electronic pen 5 is operated while being floated in the air. To deal with such a greater gripping force, the space ON load is used at S78, instead of the normal ON load. By using the space ON load greater than the normal ON load at S78, it is possible to appropriately perform 3D drawing despite such an increase in the gripping force.

The processor 2a, which has performed S79, ends the virtual reality space drawing process. Then, the processor 2a returns to S32 of FIG. 6 to perform the operation of detecting the next light reception level information and burst signal. In addition, when the processor 2a determines at S37 of FIG. 6 that the light reception level information has not been detected and when the processor 2a determines at S39 of FIG. 6 that the spatial position is not within the drawing region, the processor 2a sets the reset flag B to false (S42). After that, the processor 2a returns to S32 to perform the operation of detecting the next light reception level information and burst signal. Performing S42 can return the reset flag B to false when the electronic pen 5 is moved out of the drawing region (including a case where the electronic pen 5 is moved out of the virtual reality space).

As described above, according to the present embodiment, the electronic pen 5 is capable of outputting pressure information regarding a gripping force, and the computer 2 is capable of performing 3D drawing and 2D drawing based on the pressure information regarding the gripping force. With this configuration, even when there is no actual touch surface, the line width and the transparency can be controlled in a preferable manner.

Hereinafter, a specific configuration of the gripping force sensor 55 will be described in detail with reference to the drawings.

Figure 13:
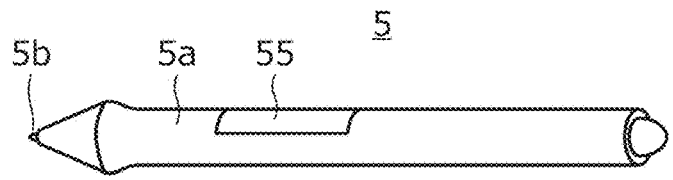
FIG. 13 is a diagram illustrating a structure of a gripping force sensor 55 according to a first example.

FIG. 13 is a diagram illustrating a structure of the gripping force sensor 55 according to a first example. The gripping force sensor 55 according to the present example includes a touch sensor capable of sensing a depressing force using a pressure-sensitive method, for example, and is provided on a side surface of the external housing 5a. The control circuit 50 for this case acquires the depressing force detected by the gripping force sensor 55 as a gripping force.

Figure 14:
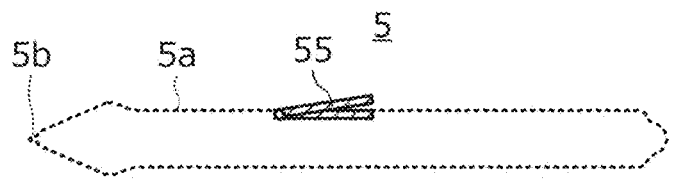
FIG. 14 is a diagram illustrating a structure of the gripping force sensor 55 according to a second example.

FIG. 14 is a diagram illustrating a structure of the gripping force sensor 55 according to a second example. The gripping force sensor 55 according to the present example includes a button mechanism capable of detecting an amount of depression in a stepwise or continuous manner and is provided on the side surface of the external housing 5a. The control circuit 50 for this case acquires the amount of depression detected by the gripping force sensor 55 as a gripping force. Specific examples of the button mechanism include an actuator, a Hall effect device, a strain gauge, and the like.

Figure 15A:
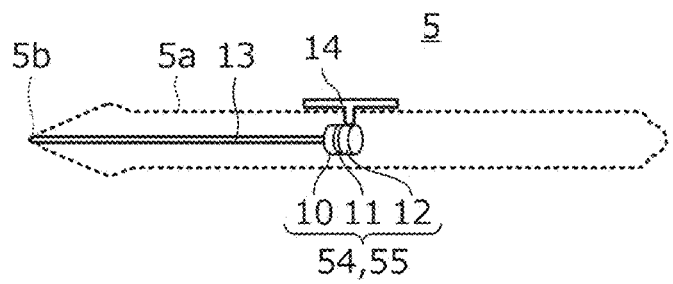
FIGS. 15A and 15B depicts diagrams illustrating a structure of the gripping force sensor 55 according to a third example.
Figure 15B:
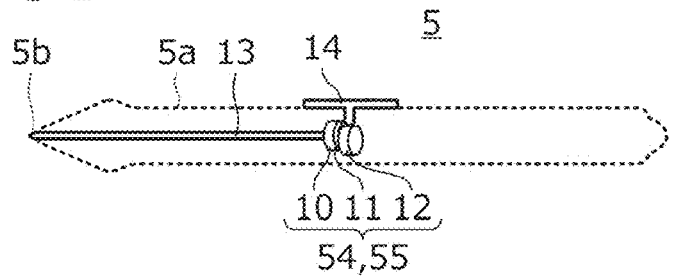

FIGS. 15A and 15B depict diagrams illustrating a structure of the gripping force sensor 55 according to a third example. The gripping force sensor 55 according to the present example also serves as the pen pressure sensor 54 and includes a capacitor having a structure in which a dielectric 11 is provided between two electrode plates 10 and 12. One end of a core body 13 is included in the pen tip 5b while another end of the core body 13 is connected to the electrode plate 10. Further, the electrode plate 12 is connected to a button mechanism 14, which is provided on the side surface of the external housing 5a.

The capacitor according to the present example is configured such that the distance between the electrode plate 10 and the electrode plate 12 changes according to a force applied to the pen tip 5b and, as a result, the capacitance also changes. Further, the capacitor according to the present example is configured such that, as can be understood by comparing FIG. 15A with FIG. 15B, the electrode plate 12 moves laterally according to an amount of depression of the button mechanism 14 and as a result, the capacitance changes. In the tablet input process illustrated in FIG. 4, the control circuit 50 according to the present example regards the capacitor according to the present example as the pen pressure sensor 54 and acquires a pen pressure from the capacitance thereof. By contrast, in the virtual reality space input process illustrated in FIG. 5, the control circuit 50 according to the present example regards the capacitor according to the present example as the gripping force sensor 55 and acquires a gripping force from the capacitance thereof. According to the present example, both the gripping force sensor 55 and the pen pressure sensor 54 can be implemented by one capacitor.

It is noted that although description has been given of the example of using the capacitor in FIGS. 15A and 15B, a load cell can also serve as both the gripping force sensor 55 and the pen pressure sensor 54. Since the load cell can measure a stress in each of an X direction, a Y direction, and a Z direction individually, a pen pressure that is a force in the pen axis direction and a gripping force that is a force perpendicular to the pen axis direction can be individually measured based on the measured individual stresses.

Figure 16:
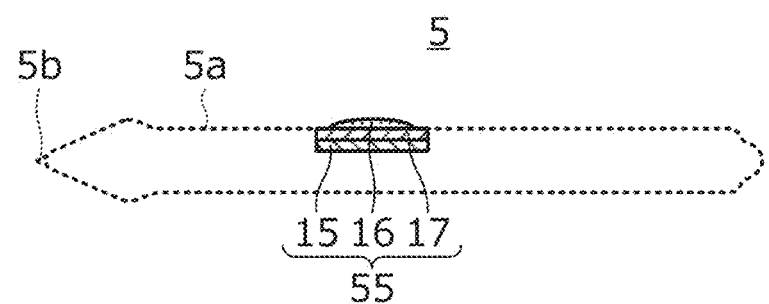
FIG. 16 is a diagram illustrating a structure of the gripping force sensor 55 according to a fourth example.

FIG. 16 is a diagram illustrating a structure of the gripping force sensor 55 according to a fourth example. The gripping force sensor 55 according to the present example has a structure in which a pressure-sensitive sensor 15, a substrate 16, and a dome button 17 are stacked, and is provided on the side surface of the external housing 5a such that the surface on the dome button 17 side is exposed. The pressure-sensitive sensor 15 is a sensor capable of sensing a depressing force applied to the surface of the external housing 5a. The dome button 17 is a button mechanism capable of being turned on and off by the user.

Figure 17A:
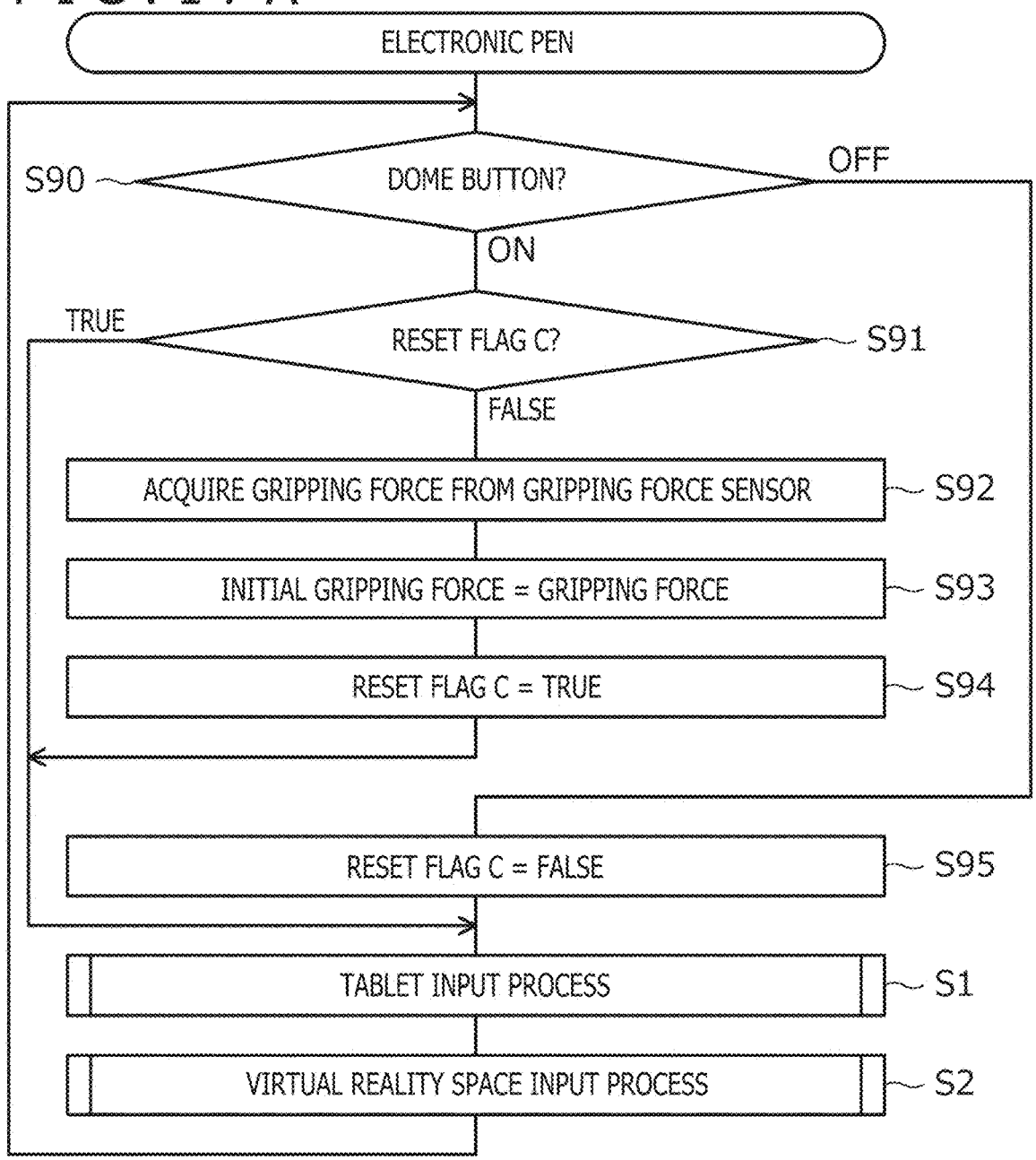
FIGS. 17A and 17B depict processing flow diagrams illustrating processing performed by the control circuit 50 of the electronic pen 5 when the gripping force sensor 55 according to the fourth example is used.
Figure 17B:
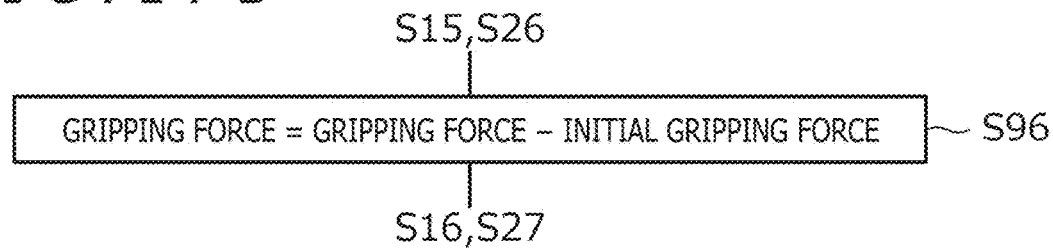

FIGS. 17A and 17B depict processing flow diagrams illustrating processing performed by the control circuit 50 of the electronic pen 5 when the gripping force sensor 55 according to the fourth example is used. FIG. 17A is a processing flow diagram in which S90 to S95 are added to the processing flow diagram illustrated in FIG. 3. Further, FIG. 17B is a processing flow diagram in which S96 is added to the processing flow diagram illustrated in FIG. 4 or 5. Hereinafter, an operation of the electronic pen 5 including the gripping force sensor 55 according to the fourth example will be described with reference to FIGS. 17A and 17B.

First, as illustrated in FIG. 17A, the control circuit 50 first determines whether the dome button 17 is on or off (S90). As a result, when the dome button 17 is determined to be off, the control circuit 50 sets a reset flag C to false (S95) and starts the tablet input process of S1. The reset flag C is a flag that indicates whether or not the dome button 17 has been just pressed. When the dome button 17 has been just pressed, the determination result at S91 described later is false.

Next, the control circuit 50, which has determined that the dome button 17 is on at S90, determines whether the reset flag C is true or false (S91). The control circuit 50, which has determined that the reset flag C is true here, starts the tablet input process of S1 immediately. On the other hand, when the reset flag C is determined to be false, the control circuit 50 acquires a gripping force from the gripping force sensor 55 (S92) and sets the acquired gripping force as an initial gripping force (S93). The initial gripping force here is a variable used for treating the gripping force when the dome button 17 is pressed as 0, and is independent of the initial gripping force used in the computer 2 (the one used in the processing flow illustrated in FIG. 10 or 11). The control circuit 50, which has performed S93, sets the reset flag C to true (S94) and starts the tablet input process of S1.

Next, as illustrated in FIG. 17B, the control circuit 50 uses a gripping force obtained by subtracting the initial gripping force from each of the gripping force acquired at S15 of FIG. 4 and the gripping force acquired at S26 of FIG. 5 as a gripping force (S96). That is, the control circuit 50 transmits, to the computer 2, pressure information regarding the gripping force obtained by subtraction at S96, not the gripping force itself acquired in the corresponding S15 or S26.

Since the control circuit 50 performs the above-described processing, the user of the electronic pen 5 according to the present example can input a pen pressure using a gripping force by increasing or decreasing the gripping force with a gripping force at the timing when the user turns on the dome button 17 on the user's own will as a reference.

Figure 18A:
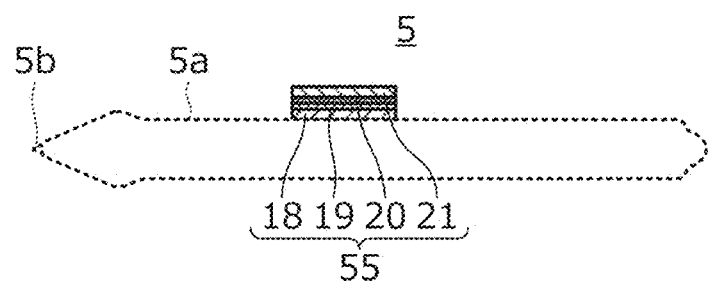
FIGS. 18A and 18B depict diagrams illustrating a structure of the gripping force sensor 55 according to a fifth example.
Figure 18B:
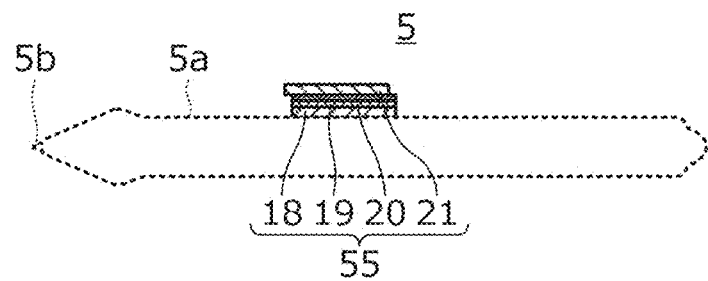

FIGS. 18A 18B depict diagrams illustrating a structure of the gripping force sensor 55 according to a fifth example. The gripping force sensor 55 according to the present example includes a capacitor and is provided on the side surface of the external housing 5a. The capacitor has a structure in which a dielectric 19 and a rubber 20 are provided between two electrode plates 18 and 21. The control circuit 50 according to the present example acquires the capacitance of the capacitor, which is the gripping force sensor 55, as a gripping force.

With the capacitor according to the present example, when the user depresses the electrode plate 21 located on the outer side, the rubber 20 is crushed according to its depressing force, decreasing the distance between the electrode plate 18 and the electrode plate 21 accordingly. This, as a result, increases the capacitance. In addition, when the user applies a force in the pen axis direction to the electrode plate 21 located on the outer side, the rubber 20 is deformed, causing the electrode plate 21 to slide in the pen axis direction as illustrated in FIG. 18B. This, as a result, decreases the capacitance. Therefore, with the gripping force sensor 55 according to the present example, not only a depressing force but also a force in the pen axis direction can be detected as a gripping force. It is noted that when the distance between the electrode plate 18 and the electrode plate 21 is d, an overlap area of the electrode plates 18 and 21 when no slide occurs is S, an amount of change of the overlap area due to a slide is ΔS, and the permittivity of members including the dielectric 19 and the rubber 20 is ε, the capacitance of the capacitor according to the present example is expressed by the following equation (1).

$$C = \varepsilon (S - \Delta S)/d \quad \ldots \quad (1)$$

Figure 19A:
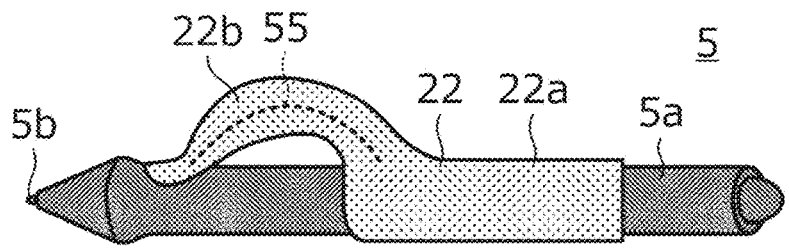
FIGS. 19A, 19B, and 19C depict diagrams illustrating a structure of the gripping force sensor 55 according to a sixth example.
Figure 19B:
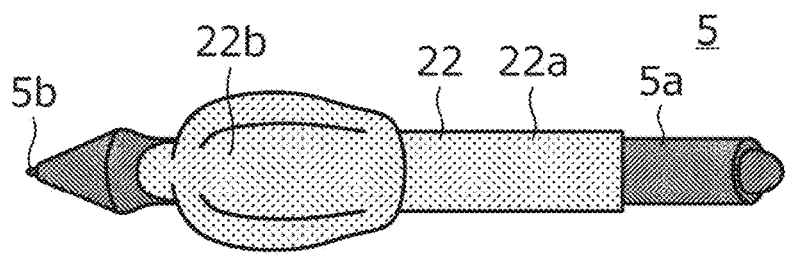
Figure 19C:
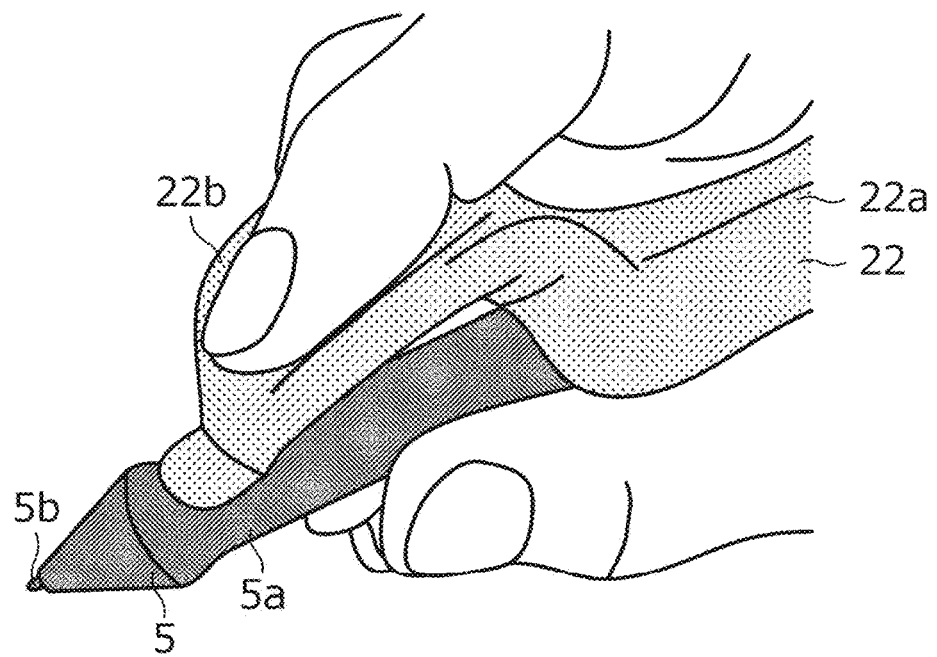

FIGS. 19A, 19B, and 19C depict diagrams illustrating a structure of the gripping force sensor 55 according to a sixth example. As illustrated in the figure, the electronic pen 5 according to the present example includes a grip member 22, which is attached to the external housing 5a. The gripping force sensor 55 according to the present example is incorporated in the grip member 22. FIG. 19A illustrates the side surface of the electronic pen 5 with the grip member 22 attached. FIG. 19B illustrates an upper surface of the electronic pen 5 with the grip member 22 attached. FIG. 19C illustrates the electronic pen 5 being used with the grip member 22 attached.

As illustrated in FIGS. 19A to 19C, the grip member 22 includes a cylindrical base 22a and a finger rest 22b. The base 22a is engaged with the external housing 5a. The finger rest 22b extends in an arch shape from one end of the base 22a. As illustrated in FIG. 19C, the user uses the electronic pen 5 with the index finger placed on the finger rest 22b. It is noted that although FIGS. 19A, 19B, and 19C illustrate examples in which the grip member 22 is a separate body from the external housing 5a, the grip member 22 and the external housing 5a may be integrally formed.

The gripping force sensor 55 is, for example, a strain gauge embedded in the finger rest 22b and is capable of detecting a force in the index finger of the user (a depressing force of the finger rest 22b). The control circuit 50 according to the present example acquires the force detected in this manner as a gripping force.

Here, incorporating an acceleration sensor in the electronic pen 5 or the grip member 22 allows the control circuit 50 to detect a user's operation of shaking the electronic pen 5. By combining this with the detection of a depressing force of the finger rest 22b using the gripping force sensor 55, an operation of tapping the touch surface can be simulated.

Although the preferred embodiments of the present disclosure have been described above, the present disclosure is by no means limited to these embodiments. As a matter of course, the present disclosure can be implemented in various modes without departing from the scope of the present disclosure.

DESCRIPTION OF REFERENCE SYMBOLS

1 Spatial position indicating system
2 Computer
2a Processor
2b Memory
3 Virtual reality display
4 Plane position sensor
4a Input surface
5 Electronic pen
5a External housing
5b Pen tip
7a, 7b Position detection device
8a to 8c Spatial position sensor
10, 12 Electrode plate
11 Dielectric
13 Core body
14 Button mechanism
15 Pressure-sensitive sensor
16 Substrate
17 Dome button
18, 21 Electrode plate
19 Dielectric
20 Rubber
22 Grip member
22a Base
22b Finger rest
50 Control circuit
51 Plane communication circuit
52 Spatial communication circuit
53 Spatial position detection circuit
54 Pen pressure sensor
55 Gripping force sensor
56 Force sense generation circuit
A Drawing region
B Virtual tablet

The invention claimed is:

1. A position indicating device operable in multiple modes including a surface mode and an air mode, comprising:
 a housing;
 a position indicator which, in operation, indicates a position;

a first sensor which, in the surface mode in which the position indicating device is used in contact with a surface, detects a pen pressure applied by the surface to a pen-tip of the position indicator, wherein the pen pressure is used to control a line width of a three-dimensional object generated in a virtual reality space;

a first communication circuit which, in response to being communicable with a position sensor, transmits the pen pressure detected by the first sensor to the position sensor; and a second communication circuit which, in operation, transmits the pen pressure detected by the first sensor to an external device other than the position sensor.

2. The position indicating device according to claim 1, wherein the second communication circuit, in operation, transmits the pen pressure to the external device that controls generation of the three-dimensional object in the virtual reality space.

3. The position indicating device according to claim 1, further comprising:
a controller which, in operation, determines the pen pressure is detected when the pen pressure detected by the first sensor exceeds a predetermined value.

4. The position indicating device according to claim 1, further comprising:
a second sensor which is located close to the pen-tip and which, in the air mode in which the position indicating device is used in the air, detects a gripping force applied to the housing,
wherein the gripping force is used to control a line width of a three-dimensional object generated in a virtual reality space.

5. The position indicating device according to claim 4, wherein the second sensor includes a touch sensor.

6. The position indicating device according to claim 4, wherein the second sensor includes a button mechanism.

7. The position indicating device according to claim 4, wherein the second sensor includes:
a dome button which, in operation, is turned on and off, and
a pressure-sensitive sensor which, in operation, senses a depressing force on the housing.

8. The position indicating device according to claim 4, wherein the first and second sensors are included in a common sensor which, in operation, detects both the pen pressure and the gripping force.

9. The position indicating device according to claim 8, wherein the common sensor includes a capacitance sensor having a capacitance that changes according to both an amount of depression of a button mechanism provided in the housing and the pen pressure.

10. The position indicating device according to claim 4, wherein a correlation exists between the pen pressure applied to the pen-tip of the position indicator and the gripping force applied to the housing.

11. The position indicating device according to claim 4, wherein the second sensor is located at a position where a pad of a finger of a user's hand in a natural writing position is pressed against.

12. The position indicating device according to claim 1, wherein, in the air mode, the first communication circuit does not transmit the pen pressure.

13. The position indicating device according to claim 1, wherein the virtual reality space includes one or more of a VR (Virtual Reality) space, an AR (Augmented Reality) space, or an MR (Mixed Reality) space.

14. An information processing device capable of communicating with a position indicating device and operable in multiple modes including a surface mode an air mode,
wherein the position indicating device includes a housing; a position indicator which, in operation, indicates a position; a first sensor which, in the surface mode in which the position indicating device is used in contact with a surface, detects a pen pressure applied by the surface to a pen-tip of the position indicator, wherein the pen pressure is used to control a line width of a three-dimensional object generated in a virtual reality space; a first communication circuit which, in response to being communicable with a position sensor, transmits the pen pressure detected by the first sensor to the position sensor; and a second communication circuit which, in operation, transmits the pen pressure detected by the first sensor to an external device other than the position sensor,
the information processing device comprising:
communication circuit which, in operation, receives the pen pressure detected by the first sensor of the position indicating device from the second communication circuit of the position indicating device which is not used on the position sensor; and
a controller which, in operation, uses the pen pressure to control a line width of a three-dimensional object generated in a virtual reality space.

15. The information processing device according to claim 14,
wherein the controller:
sets a drawing region in the virtual reality space,
determines whether a position of the position indicating device is within the drawing region set in the virtual reality space, and
controls the generation of the three-dimensional object when the position of the position indicating device is determined to be within the drawing region.

16. The information processing device according to claim 14, wherein the position indicating device further includes a second sensor which is located close to the pen-tip and which, in the air mode in which the position indicating device is used in the air, detects a gripping force applied to the housing,
wherein the controller of the information processing device:
acquires a correlation between the pen pressure applied to the pen-tip of the position indicator and the gripping force applied to the housing, and
controls the line width based on the acquired correlation.

17. The information processing device according to claim 14,
wherein the controller controls the generation of the three-dimensional object in the virtual reality space based on a position of the position indicating device.

18. The information processing device according to claim 14,
wherein the controller, in the surface mode, controls a two-dimensional drawing based on the position indicated by the position indicating device on the surface.

19. The information processing device according to claim 14,
wherein the virtual reality space includes one or more of a VR (Virtual Reality) space, an AR (Augmented Reality) space, or an MR (Mixed Reality) space.

20. The information processing device according to claim 14, wherein the position indicating device further includes a second sensor, which is located close to the pen-tip at a position where a pad of a finger of a user's hand in a natural writing position is pressed against, and which, in the air mode in which the position indicating device is used in the air, detects a gripping force applied to the housing.

* * * * *